United States Patent
Zhou et al.

(10) Patent No.: US 10,795,379 B2
(45) Date of Patent: Oct. 6, 2020

(54) FLIGHT CONTROL METHOD AND FLIGHT CONTROL APPARATUS FOR AIRCRAFT

(71) Applicant: TENCENT TECHNOLOGY (SHENZHEN) COMPANY LIMITED, Shenzhen (CN)

(72) Inventors: Dajun Zhou, Shenzhen (CN); Junfeng Shen, Shenzhen (CN); Bin Wang, Shenzhen (CN); Xuefeng Wei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 212 days.

(21) Appl. No.: 16/006,600

(22) Filed: Jun. 12, 2018

(65) Prior Publication Data

US 2018/0373271 A1    Dec. 27, 2018

Related U.S. Application Data

(63) Continuation of application No. PCT/CN2017/100837, filed on Sep. 7, 2017.

(30) Foreign Application Priority Data

Sep. 9, 2016    (CN) .......................... 2016 1 0814711

(51) Int. Cl.
   *G05D 1/00*    (2006.01)
   *G08G 5/00*    (2006.01)
   (Continued)

(52) U.S. Cl.
   CPC ........... *G05D 1/104* (2013.01); *G05D 1/0016* (2013.01); *G05D 1/0027* (2013.01);
   (Continued)

(58) Field of Classification Search
   CPC ....... B64C 39/00; B64C 39/024; B64C 25/32; B64C 37/00; G05D 1/00; G05D 1/0016;
   (Continued)

(56) References Cited

U.S. PATENT DOCUMENTS

| | | | |
|---|---|---|---|
| 5,631,640 A * | 5/1997 | Deis ......................... | F41G 7/343 340/961 |
| 6,334,344 B1 * | 1/2002 | Bonhoure .............. | G05D 1/101 244/190 |

(Continued)

FOREIGN PATENT DOCUMENTS

| | | |
|---|---|---|
| CN | 104298248 | 1/2015 |
| CN | 105182992 | 12/2015 |

(Continued)

OTHER PUBLICATIONS

International Search Report dated Nov. 29, 2017 in PCT/CN2017/100837 filed Sep. 7, 2017. (With English Translation).

(Continued)

*Primary Examiner* — Yonel Beaulieu
(74) *Attorney, Agent, or Firm* — Oblon, McClelland, Maier & Neustadt, L.L.P.

(57) ABSTRACT

Aspects of the disclosure provide a method for flight control and a control apparatus for flight control. In an example, a first aircraft includes the control apparatus for flight control and the control apparatus includes interface circuitry and processing circuitry. The interface circuitry receives a first flight control instruction and a flight parameter. The first flight control instruction and the flight parameter are sent by a mobile terminal device. The flight parameter is indicative of a preset flight altitude. In response to the first flight control instruction, the processing circuitry controls the first aircraft to fly to the preset flight altitude. Further, the processing circuitry detects an existence of a second aircraft within a surrounding of the first aircraft, and adjusts a flight (Continued)

---

101 — Obtain a first flight control instruction and a flight parameter that are sent by a mobile terminal 102 — In response to the first flight control instruction, control the first aircraft to fly to the preset flight altitude 103 — Determine whether a target aircraft exists within the surrounding of the first aircraft; and determine a flight attitude of the first aircraft according to a determining result obtained after whether the target aircraft exists within the surrounding of the first aircraft is determined posture of the first aircraft according to the existence detection of the second aircraft within the surrounding of the first aircraft.

20 Claims, 8 Drawing Sheets

(51) Int. Cl.
G05D 1/10 (2006.01)
G08G 5/04 (2006.01)

(52) U.S. Cl.
CPC ......... *G05D 1/0033* (2013.01); *G05D 1/0088* (2013.01); *G08G 5/0013* (2013.01); *G08G 5/0021* (2013.01); *G08G 5/0043* (2013.01); *G08G 5/0052* (2013.01); *G08G 5/0056* (2013.01); *G08G 5/0065* (2013.01); *G08G 5/0069* (2013.01); *G08G 5/0082* (2013.01); *G08G 5/045* (2013.01)

(58) Field of Classification Search
CPC .. G05D 1/0027; G05D 1/0033; G05D 1/0088; G08G 5/00; G08G 5/0013; G08G 5/0021; G08G 5/0043; G08G 5/0052; G08G 5/0056; G01S 13/00; G01S 13/933
See application file for complete search history.

(56) References Cited

U.S. PATENT DOCUMENTS

| | | | | |
|---|---|---|---|---|
| 6,424,889 | B1* | 7/2002 | Bonhoure | G05D 1/0202 244/183 |
| 6,546,338 | B2* | 4/2003 | Sainthuile | G08G 5/045 701/301 |
| 6,665,063 | B2* | 12/2003 | Jamieson | G01C 23/005 356/141.1 |
| 7,194,353 | B1* | 3/2007 | Baldwin | G01C 21/00 701/528 |
| 9,437,112 | B1* | 9/2016 | Greene | G08G 5/0052 |
| 9,830,829 | B1* | 11/2017 | Doyen | G08G 5/0082 |
| 2016/0241767 | A1 | 8/2016 | Cho et al. | |
| 2018/0051986 | A1* | 2/2018 | Melby | G05D 1/042 |

FOREIGN PATENT DOCUMENTS

| | | |
|---|---|---|
| CN | 205015741 | 2/2016 |
| CN | 105892472 | 8/2016 |
| CN | 205540284 | 8/2016 |
| CN | 106168807 | 11/2016 |
| JP | 2011248544 | 12/2011 |
| WO | 2011148729 | 12/2011 |

OTHER PUBLICATIONS

Office Action dated Jul. 25, 2017 in Chinese Patent Application No. 201610814711.1 (With Concise English Translation).

* cited by examiner

FLIGHT CONTROL METHOD AND FLIGHT CONTROL APPARATUS FOR AIRCRAFT

RELATED APPLICATION

This application is a continuation of International Application No. PCT/CN2017/100837, filed on Sep. 7, 2017, which claims priority to Chinese Patent Application No. 201610814711.1, filed with the Chinese Patent Office on Sep. 9, 2016, and entitled "FLIGHT CONTROL METHOD AND FLIGHT CONTROL APPARATUS FOR AIRCRAFT". The entire disclosures of the prior applications are incorporated by reference herein in their entirety.

FIELD OF THE TECHNOLOGY

This application relates to the field of aircraft technologies, and in particular, to a flight control method and a flight control apparatus for an aircraft.

BACKGROUND OF THE DISCLOSURE

Aircrafts are widely applied in aspects of national economy and military affairs. Aircrafts haven been widely applied to the fields of aerial photography, electric check, environmental monitoring, forest-fire prevention, disaster detection, anti-terrorism and lifesaving, military reconnaissance, battlefield assessment, and the like. An aircraft is an unmanned airplane operated by a radio remote control device and a self-contained program control apparatus. There is no control cabin in the aircraft, but devices such as an autopilot, a program control apparatus, and an information acquisition apparatus are installed. A person in a remote control station performs tracking, locating, remote control, remote measurement, and digital transmission on the aircraft by using a radar device or the like.

Generally, the following two solutions are used when an aircraft implements a flight action: 1. During the flight of the aircraft, a user manually controls the aircraft to implement a basic flight motion by manually controlling a joystick in a remote control. 2. A user operates a handheld device to simulate and control a joystick, and a flight motion of the aircraft is controlled by the joystick, where the handheld device may refer to a mobile device such as a smartphone or a tablet computer.

Based on the foregoing solution, generally, the following application scenario exist: Multiple users respectively operate their aircrafts to fly, to implement co-flight of multiple aircrafts in the sky, and each user can have playability experience of co-operating with other users, for example, in a one versus one (1V1) application scenario of aircrafts, two aircrafts may be operated by different users to implement a 1V1 battle. However, in a current solution, multiple aircrafts need to be respectively operated by multiple users at the same time, and in an implementation scenario in which one user cannot operate multiple aircrafts at the same time, co-flight of at least two aircrafts cannot be implemented. In addition, in an implementation scenario in which each aircraft is operated by one user, regardless of whether a remote control or a handheld device is used, a flight motion of the aircraft is controlled by using a joystick, but in such a method for controlling an aircraft by using a joystick, the user needs to pay attention to a flight trajectory of the aircraft all the time, and manipulations of different users are different. Consequently, it is very different to implement co-flight of at least two aircrafts.

SUMMARY

Embodiments of this application provide a flight control method and a flight control apparatus for an aircraft, so as to implement co-flight of at least two aircrafts.

Aspects of the disclosure provide a method for flight control and a control apparatus for flight control. In an example, a first aircraft includes the control apparatus for flight control and the control apparatus includes interface circuitry and processing circuitry. The interface circuitry receives a first flight control instruction and a flight parameter. The first flight control instruction and the flight parameter are sent by a mobile terminal device. The flight parameter is indicative of a preset flight altitude. In response to the first flight control instruction, the processing circuitry controls the first aircraft to fly to the preset flight altitude. Further, the processing circuitry detects an existence of a second aircraft within a surrounding of the first aircraft, and adjusts a flight posture of the first aircraft according to the existence detection of the second aircraft within the surrounding of the first aircraft.

In some embodiments, the processing circuitry acquires an ambient environment image of the first aircraft, and determines, according to the ambient environment image, whether the second aircraft exists within the surrounding of the first aircraft. In an example, the processing circuitry varies a viewing angle of a camera on the first aircraft and acquires a plurality of ambient environment images respectively at different viewing angles. In an embodiment, the processing circuitry controls the first aircraft to enter a hover state when the first aircraft flies to the preset flight altitude, and acquires the ambient environment image when the first aircraft is in the hover state.

In some embodiments, the processing circuitry obtains a flight direction of the second aircraft when the existence of the second aircraft within the surrounding of the first aircraft is detected, and determines the flight posture for the first aircraft to have the same flight direction as the second aircraft.

According to an aspect of the disclosure, the processing circuitry obtains a flight direction of the second aircraft when the second aircraft is discovered in the surrounding of the first aircraft, and controls the first aircraft to fly with the second aircraft without collision according to the flight direction of the second aircraft. In an example, when the second aircraft flies towards the first aircraft from a left side of the first aircraft, the processing circuitry controls the first aircraft to fly to a right side, and to change a flight altitude of the first aircraft. In another example, when the second aircraft flies towards the first aircraft from a right side of the first aircraft, the processing circuitry controls the first aircraft to fly to a left side, and to change a flight altitude of the first aircraft. In another example, when the second aircraft flies towards the first aircraft from a back side of the first aircraft, the processing circuitry controls the first aircraft to fly in one of a forward direction, a right direction, or a left direction, and to change a flight altitude of the first aircraft.

In some embodiment, the processing circuitry obtains, when the second aircraft is not discovered within the surrounding of the first aircraft, a previous existence detection of the second aircraft in the surrounding of the first aircraft. Then the processing circuitry adjusts the flight posture of the first aircraft according to a previous flight posture adjustment that is determined according to the previous existence detection of the second aircraft.

Further, in some embodiments, the processing circuitry determines whether the first aircraft approaches a flight boundary, and changes the flight posture of the first aircraft in a direction to remain in the flight boundary when the first aircraft approaches the flight boundary. The flight posture includes at least one of a flight speed, a flight altitude, and a flight direction.

According to an aspect of the disclosure, a non-transitory computer-readable medium stores instructions which when executed by a computer can cause the computer to perform the method for flight control.

In the embodiments of this application, a first aircraft may enable an artificial intelligence (AI) automatic flight mode according to a first flight control instruction and a flight parameter that are delivered by a mobile terminal, and fly to a preset flight altitude and then enter a hover state. Therefore, the first aircraft can automatically take off without requiring a real-time operation by a user. In the embodiments of this application, whether a target aircraft exists within the surrounding of the first aircraft may be further determined, and a flight attitude of the first aircraft is adjusted according to a current determining result obtained after whether the target aircraft exists within the surrounding of the first aircraft is determined. Therefore, a flight process of the first aircraft is closely related to the target aircraft, so as to implement co-flight of the first aircraft and the target aircraft, and implement co-flight of at least two aircrafts.

BRIEF DESCRIPTION OF THE DRAWINGS

To describe the technical solutions in the embodiments of this application more clearly, the following briefly introduces the accompanying drawings required for describing the embodiments. The accompanying drawings in the following description show merely some embodiments of this application, and persons skilled in the art may still derive other drawings from these accompanying drawings.

FIG. 2-*a* is a schematic diagram of a flight control implementation solution for an aircraft according to an embodiment of this application;

FIG. 2-*b* is a schematic diagram of an automatic pathfinding implementation solution for an aircraft according to an embodiment of this application;

FIG. 2-*c* is a schematic diagram of an automatic pathfinding algorithm for an aircraft according to an embodiment of this application;

FIG. 2-*d* is a schematic diagram of another automatic pathfinding algorithm for an aircraft according to an embodiment of this application;

FIG. 3-*a* is a schematic composition diagram of a flight control apparatus according to an embodiment of this application;

FIG. 3-*b* is a schematic composition diagram of a target tracking module according to an embodiment of this application;

FIG. 3-*c* is a schematic composition diagram of another target tracking module according to an embodiment of this application;

FIG. 3-*d* is a schematic composition diagram of another target tracking module according to an embodiment of this application;

FIG. 3-*e* is a schematic composition diagram of another flight control apparatus according to an embodiment of this application;

FIG. 3-*f* is a schematic composition diagram of another flight control apparatus according to an embodiment of this application; and FIG. 4-*a* is a schematic structural diagram of a flight control apparatus according to an embodiment of this application.

DESCRIPTION OF EMBODIMENTS

Embodiments of this application provide a flight control method and a flight control apparatus for an aircraft, so as to implement co-flight of at least two aircrafts in an implementation scenario in which a user cannot operate multiple aircrafts at the same time.

To make the application objectives, features, and advantages of this application clearer and more comprehensible, the following clearly and completely describes the technical solutions in the embodiments of this application with reference to the accompanying drawings in the embodiments of this application. The described embodiments are merely some but not all of the embodiments of this application. All other embodiments obtained by persons skilled in the art based on the embodiments of this application shall fall within the protection scope of this application.

The terms "include", "contain" and any other variants thereof in the specification, claims, and accompanying drawings of this application are intended to cover a non-exclusive inclusion, so that a process, a method, a system, a product, or a device that includes a series of units is not necessarily limited to those units, but may include other units not expressly listed or inherent to such a process, method, product, or device.

Detailed descriptions are separately provided below.

An embodiment of a flight control method for an aircraft in this application may be specifically applied to automatic flight control on a first aircraft, so as to implement co-flight of the first aircraft and one or more second aircrafts (also referred to as target aircrafts). The first aircraft may include a flight control apparatus. Flight control on the first aircraft is performed by the flight control apparatus. The flight control apparatus receives a flight control instruction by using a mobile terminal, and the flight control apparatus controls the first aircraft. Herein, the aircraft may be specifically an unmanned aerial vehicle or may be a remote control aircraft, a model airplane, or the like.

Figure 1:
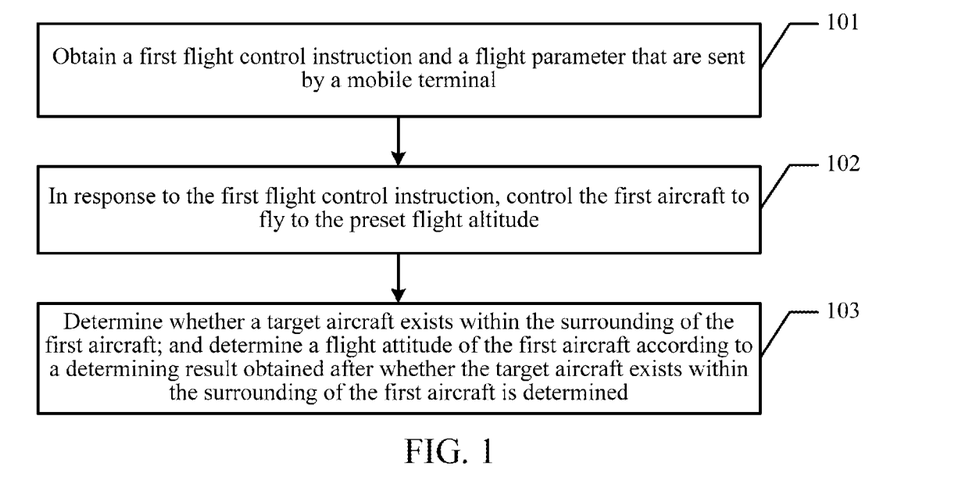
FIG. 1 is a flowchart of a flight control method for an aircraft according to an embodiment of this application.

Next, a flight control method for an aircraft provided in an embodiment of this application is described from the perspective of a flight control apparatus. As shown in FIG. 1, the method may include the following steps:

101: Obtain a first flight control instruction and a flight parameter that are sent by a mobile terminal. The first flight control instruction is used to control a first aircraft to enter an AI automatic flight mode, and the flight parameter includes a preset flight altitude.

In this embodiment of this application, the mobile terminal may be a user controller of the first aircraft. A user may send a control instruction to the first aircraft by using the mobile terminal. A communications module in the mobile terminal and a communications module in the flight control apparatus may be connected by using a wireless network or may use paired data transmission modules. The mobile terminal and the flight control apparatus may use the Micro Air Vehicle Link (MavLink) protocol. The MavLink protocol is a communication protocol used for a small unmanned vehicle. The mobile terminal may communicate and interact with the flight control apparatus.

After initialization of the first aircraft, the first aircraft starts regular operations, the mobile terminal may send the first flight control instruction and the flight parameter to the first aircraft, and the user may instruct the first aircraft by using the mobile terminal, for example, the user may control the first aircraft to enter the AI automatic flight mode, and the user may further set a flight altitude of the first aircraft. The flight control apparatus may receive the first flight control instruction and the flight parameter that are sent by the mobile terminal. The flight control instruction is sent by the user to the first aircraft by using the mobile terminal, and the flight control instruction carries a flight mode that needs to be controlled by the user for the first aircraft. During actual application, the first aircraft may have multiple flight modes, for example, the flight mode may be a manual control flight mode or may be the AI automatic flight mode. In this embodiment of this application, the first aircraft may fly according to a real-time operation by the user, and besides that, the first aircraft may implement flight with automatic pathfinding according to the configured AI automatic flight mode, so that flight with automatic pathfinding can be implemented without requiring a real-time operation by the user. The flight parameter includes a flight altitude configured by the user by using the mobile terminal. The flight altitude is an altitude that the first aircraft needs to fly to in a takeoff stage, and may be specifically configured by default or preconfigured according to an application scenario.

102: In response to the first flight control instruction, control the first aircraft to fly to the preset flight altitude.

In this step, the first aircraft may be controlled, according to the first flight control instruction, to enable the AI automatic flight mode, and the first aircraft is controlled, according to the flight parameter, to fly to the preset flight altitude and then enters a hover state.

In this embodiment of this application, after obtaining the first flight control instruction and the flight parameter, the flight control apparatus may control the first aircraft to perform takeoff according to the first flight control instruction and the flight parameter, and the first aircraft enables the AI automatic flight mode and flies to the preset flight altitude. The first aircraft may enter the hover state after flying to the preset flight altitude.

Therefore, after the first aircraft enters the AI automatic flight mode, the first aircraft can automatically fly without a need of receiving again a flight control instruction sent by the mobile terminal. For details of implementation of an automatic flight process of the first aircraft, refer to descriptions of a subsequent step 103.

In some embodiments of this application, for the flight control method for an aircraft provided in this embodiment of this application, in addition to the foregoing steps, the flight control method for an aircraft further includes the following steps:

A1: Obtain a second flight control instruction sent by the mobile terminal, where the second flight control instruction is used to control the first aircraft to cancel an AI automatic flight mode.

A2: Control the first aircraft to exit the AI automatic flight mode, and control the first aircraft to enter a hover state according to the second flight control instruction.

During the flight, the first aircraft responds to a user input in priority, and the user may interrupt automatic flight of the first aircraft, and manually control flight of the first aircraft. In this way, safety of the first aircraft can be ensured in priority, and occurrence of an abnormal case such as a collision of the first aircraft can be prevented. For example, when the user still needs to control the first aircraft, the user may send the second flight control instruction by using the mobile terminal, and then, controls the first aircraft to exit the AI automatic flight mode and controls the first aircraft to enter the hover state according to the second flight control instruction.

In some embodiments of this application, for the flight control method for an aircraft, in addition to the foregoing steps, the flight control method for an aircraft further includes the following steps:

B1: Obtain a battery level of the first aircraft, and determine whether the battery level of the first aircraft is less than a preset threshold.

B2: Control the first aircraft to descend if the battery level is less than the threshold.

B3: Control the first aircraft to return to a takeoff point if the battery level is greater than or equal to the threshold.

In some embodiments of this application, during the flight of the first aircraft according to the AI automatic flight mode, a parameter of the first aircraft may be further monitored in real time. For example, the battery level of the first aircraft may be detected, to determine whether the battery level of the first aircraft is capable of maintaining a flight status of the first aircraft. Whether the battery level of the first aircraft is less than the preset threshold is determined; and the first aircraft is controlled to descend if the battery level is less than the threshold; or the first aircraft is controlled to return to the takeoff point if the battery level is greater than or equal to the threshold.

103: Determine whether a target aircraft exists within the surrounding of the first aircraft; and determine a flight attitude of the first aircraft according to a determining result obtained after whether the target aircraft exists within the surrounding of the first aircraft is determined.

In this embodiment of this application, the first aircraft enables the AI automatic flight mode and flies to the preset flight altitude. Next, the surrounding of the first aircraft may be detected, to determine whether another aircraft (that is, the target aircraft) exists. If the another aircraft exists within the surrounding of the first aircraft, the aircraft may be controlled to start to fly according to the determined flight attitude at the preset flight altitude. Herein, the flight attitude may include, for example, a flight speed, a flight altitude, a flight direction, a rotation axis and/or a rotation speed.

Herein, the target aircraft may particularly refer to aircrafts of some types or may not particularly refer to some aircrafts, as long as the target aircraft is an aircraft other than the first aircraft. For example, an ambient environment image of the first aircraft may be acquired and analyzed to perform determining, or the target aircraft may be detected by using an infrared imaging module disposed in the first aircraft. All objects in nature can radiate an infrared ray. The infrared imaging module (such as a detector) is used to measure an infrared difference between a target and a background to obtain an infrared image formed by different thermal infrared rays. Whether the target aircraft exists within the surrounding of the first aircraft is determined by using the infrared image. After whether the target aircraft exists within the surrounding of the first aircraft is determined, the flight attitude of the first aircraft may be determined according to determining on the target aircraft. The flight attitude of the first aircraft may refer to a direction, an altitude, and a position of the aircraft. In an implementation process of tracking the target aircraft by using the first aircraft, the first aircraft is mainly controlled to move with the target aircraft. For example, the determining a flight attitude may be only controlling the first aircraft to fly forward or may refer to controlling the first aircraft to implement a flight action such as rolling over.

In some embodiments of this application, the determining whether a target aircraft exists within the surrounding of the first aircraft in step 103 may include the following steps:

C1: Acquire an ambient environment image of the first aircraft (in this case, the first aircraft may be in the hover state).

C2: Determine, according to the ambient environment image, whether the target aircraft exists within the surrounding of the first aircraft.

After the first aircraft takes off through the descriptions in step 102, the first aircraft may be in the hover state. In this case, a camera in the first aircraft may be enabled to acquire the ambient environment image of the first aircraft. The ambient environment image refers to image information acquired around the first aircraft after the first aircraft takes off and when the first aircraft is in the hover state.

In some embodiments of this application, the acquiring an ambient environment image of the first aircraft in step C1 may specifically include the following steps:

C11: Acquire a front environment image of the first aircraft according to a direction of a current angle of view of a camera of the first aircraft, and then adjust the direction of the angle of view of the camera of the first aircraft, to acquire a rear environment image, a left environment image, and a right environment image of the first aircraft. When the environment image is acquired, the first aircraft may be in the hover state.

In some embodiments of this application, a visual system may be disposed in the first aircraft. The visual system is used to acquire the ambient environment image of the first aircraft. For example, at least one camera is disposed in the visual system, so that a front environment image is acquired according to a direction of a current angle of view of the camera when the first aircraft is in the hover state, and then, the direction of the angle of view of the camera of the first aircraft is adjusted, to acquire a rear environment image, a left environment image, and a right environment image when the first aircraft is in the hover state. What is not limited is that, multiple cameras may be also disposed in the first aircraft to acquire ambient environment images at the same time. This is not limited herein.

After the ambient environment image of the first aircraft is acquired by means of step C1, step C2 is performed, that is, image detection is performed on the ambient environment image, so as to determine whether the target aircraft exists within the surrounding of the first aircraft. For example, an image feature of the target aircraft may be prestored, and then image classification and detection are performed on the ambient environment image by using the image feature of the target aircraft, so as to determine whether the target aircraft exists within the surrounding of the first aircraft. In addition, a fuzzy determining manner may be used. Generally, after the first aircraft takes off, the first aircraft is in mid air, and whether a flying object exists around the first aircraft may be determined by detecting an ambient environment image. In this embodiment of this application, a used aircraft detection algorithm may be a method based on an Adaboost learning algorithm, for example, a fast calculation method based on a feature value of a Haar-like rectangular feature. What is not limited is that, in another embodiment of this application, the aircraft detection algorithm used in this embodiment of this application may be a neural network method or a method based on a geometrical feature. The flight attitude of the first aircraft may be determined according to determining on the target aircraft. The flight attitude of the first aircraft may refer to a direction, an altitude, and a position of the aircraft. In an implementation process of tracking the target aircraft by using the first aircraft, the first aircraft is mainly controlled to move with the target aircraft. For example, the determining a flight attitude may be only controlling the first aircraft to fly forward or may refer to controlling the first aircraft to implement a flight action such as rolling over.

In some embodiments of this application, the determining a flight attitude of the first aircraft according to a determining result obtained after whether the target aircraft exists within the surrounding of the first aircraft is determined in step 103 includes the following steps:

D1: Obtain a flight direction of the target aircraft if it is determined, according to the determining result, that the target aircraft is discovered in a rear environment of the first aircraft.

D2: Control, if the target aircraft flies to the first aircraft in a left direction of the first aircraft, the first aircraft to fly in a right direction, and change a flight altitude of the first aircraft.

D3: Control, if the target aircraft flies to the first aircraft in a right direction of the first aircraft, the first aircraft to fly in a left direction, and change a flight altitude of the first aircraft.

D4: Control, if the target aircraft flies to the first aircraft in a forward direction of the first aircraft, the first aircraft to fly in the forward direction, or fly in a right direction, or fly in a left direction, and change a flight altitude of the first aircraft.

Step D1 to step D4 describe specific implementation scenarios of co-flight of the first aircraft and the target aircraft. First, it is determined, according to the determining result, that the target aircraft is discovered in the rear environment of the first aircraft. In this case, the target aircraft is in the rear of a current flying position of the first aircraft. Next, the flight direction of the target aircraft is obtained. For example, a captured image of the target aircraft may be detected in real time, to determine the flight direction of the target aircraft. For different flight directions of the target aircraft, the first aircraft may separately fly according to the flight control methods in step D2 to step D4. It should be noted that, step D2 to step D4 are merely implementations of determining the flight attitude of the first aircraft when the target aircraft is discovered in the rear environment of the first aircraft. When the target aircraft is discovered in the front environment, the left environment, or the right environment of the first aircraft, the flight attitude of the first aircraft may also be determined based on a manner described in this embodiment, to implement co-flight of the first aircraft and the target aircraft.

In some other embodiments of this application, the determining a flight attitude of the first aircraft according to a determining result obtained after whether the target aircraft exists within the surrounding of the first aircraft is determined in step 103 includes: obtaining a flight direction of the target aircraft if the target aircraft exists within the surrounding of the first aircraft; and determining that a flight direction of the first aircraft is the same as the flight direction of the target aircraft. For example, if the target aircraft flies to the right, the first aircraft is controlled to also fly to the right, so that flight lines thereof are consistent.

In some other embodiments of this application, the determining a flight attitude of the first aircraft according to a determining result obtained after whether the target aircraft exists within the surrounding of the first aircraft is determined in step 103 includes: determining, according to the determining result, that the target aircraft is not discovered in an ambient environment of the first aircraft, and determining that the flight attitude of the aircraft is a preset flight attitude. For example, the flight attitude of the first aircraft may be predetermined if the target aircraft is not discovered in the ambient environment of the first aircraft, and corresponding data may be prestored in the aircraft.

In this embodiment of this application, after the aircraft flies according to the determined flight attitude, the flight control apparatus may adjust the flight attitude of the first aircraft at regular intervals. For example, the flight control apparatus may periodically adjust the flight attitude of the first aircraft, and an adjustment period may be set to 5 times/second, 10 times/second, or the like. The flight control apparatus adjusts the flight attitude of the first aircraft each time according to a current determining result obtained after whether the target aircraft exists within the surrounding of the first aircraft is determined, which, for example, may include the following steps:

E1: Determine, according to a current determining result, that the target aircraft is not discovered in a rear environment of the first aircraft.

E2: Obtain, in a historical determining result (for example, a previous determining result) before the current determining result, whether the target aircraft is discovered in the rear environment of the first aircraft.

E3: Adjust the flight attitude of the first aircraft according to a flight attitude adjustment manner for the first aircraft for the historical determining result if it is determined, according to the historical determining result, that the target aircraft is discovered in the rear environment of the first aircraft.

E4: Control, if it is determined, according to the historical determining result, that the target aircraft is not discovered in the rear environment of the first aircraft, the first aircraft to fly in a forward direction, or fly in a right direction, or fly in a left direction.

In the implementations of step D1 to step D4, a solution when the target aircraft is discovered in the rear environment of the first aircraft is described, and in this embodiment, an adjustment solution for the first aircraft when the target aircraft is not discovered in the rear environment of the first aircraft is described. In this embodiment of this application, adjustment of the flight attitude of the first aircraft by the flight control apparatus is a periodic control behavior. A historical adjustment process exists before a current adjustment process, and an adjustment period may be set to, for example, 5 times/second or 10 times/second. Therefore, when the current determining result indicates that the target aircraft is not discovered, how to adjust the flight attitude of the first aircraft in the current adjustment process may be further determined with reference to the historical determining result. Specifically, whether the target aircraft is discovered in the rear environment of the first aircraft in the historical determining result before the current determining result may be obtained. If it is determined, according to the historical determining result, that the target aircraft is discovered in the rear environment of the first aircraft, the flight attitude of the first aircraft is adjusted according to the flight attitude adjustment manner for the first aircraft for the historical determining result, that is, the flight attitude of the first aircraft continues to be adjusted according to the previous flight attitude adjustment manner. For example, for the previous flight attitude adjustment manner, refer to the embodiment shown in step D1 to step D4. If it is determined, according to the historical determining result, that the target aircraft is not discovered in the rear environment of the first aircraft, the first aircraft is controlled to fly in the forward direction, or fly in the right direction, or fly in the left direction. Therefore, when the current determining result and the previous determining result both indicate that the target aircraft is not discovered, a manner of randomly adjusting the flight attitude of the first aircraft may be used, to control the first aircraft to fly in the forward direction, fly in the right direction, or fly in the left direction. Herein, the first aircraft cannot fly in a backward direction, to prevent an increase in a risk of colliding with the target aircraft. In addition, persons skilled in the art may understand that, although whether the target aircraft is discovered in the rear environment of the first aircraft is described above, the principle is also applicable to another direction.

In some embodiments of this application, the flight parameter further includes a preset flight boundary, and the flight boundary includes at least one of the following information: a maximum flight distance, a maximum flight altitude, and a minimum flight altitude. In this implementation scenario, after the first aircraft flies according to the determined or adjusted flight attitude, the flight control method for an aircraft provided in this embodiment of this application further includes the following steps:

F1: Determine whether the first aircraft that flies according to the flight attitude reaches a flight boundary.

F2: Change the flight attitude of the first aircraft to make the first aircraft return to be within the flight boundary if the first aircraft reaches the flight boundary.

When the user sends various parameters of the flight boundary to the first aircraft by using the mobile terminal, during the flight of the first aircraft, the flying position of the first aircraft further needs to be detected. If the first aircraft reaches the flight boundary, the flight attitude of the first aircraft needs to be changed to make the first aircraft return to be within the flight boundary, so as to implement real-time and automatic adjustment on the first aircraft according to the flight boundary without requiring a manual operation by the user.

Further, in some embodiments of this application, the changing the flight attitude of the first aircraft to make the first aircraft return to be within the flight boundary in step F2 includes the following steps:

F21: Control the first aircraft to fly in an upward direction and fly in a backward direction, or fly in a downward direction and fly in a backward direction, or fly in an upward direction and fly in a right direction, or fly in a downward direction and fly in a right direction, or fly in an upward direction and fly in a left direction, or fly in a downward direction and fly in a left direction.

F22: Determine whether the first aircraft flies to the maximum flight altitude in the upward direction, and if yes, control the first aircraft to fly downward.

F23: Determine whether the first aircraft flies to the minimum flight altitude in the downward direction, and if yes, control the first aircraft to fly upward.

In an implementation solution of changing the flight attitude of the first aircraft to control the first aircraft to return to be within the flight boundary, there may be multiple implementations, as long as the first aircraft does not cross the flight boundary that is set by the user in advance. When the flight distance of the first aircraft reaches the maximum flight distance, step F21 may be performed, and after the flight altitude of the first aircraft is changed in step F21, whether the maximum or minimum flight altitude is exceeded further needs to be determined, to change the flight altitude of the first aircraft again, so as to prevent the altitude from exceeding a limit, thereby implement real-time and automatic adjustment on the first aircraft according to the flight boundary without requiring a manual operation by the user.

It may be learned from the descriptions of this embodiment of this application in the foregoing embodiment, a first aircraft may enable an AI automatic flight mode according to a first flight control instruction and a flight parameter that are sent by a mobile terminal, and fly to a preset flight altitude and then enter a hover state. Therefore, the first aircraft can automatically take off without requiring a real-time operation by a user. In this embodiment of this application, whether a target aircraft exists within the surrounding of the first aircraft may be further determined, and a flight attitude of the first aircraft is determined or adjusted according to a determining result obtained after whether the target aircraft exists within the surrounding of the first aircraft is determined. Therefore, a flight process of the first aircraft is closely related to the target aircraft, so as to implement co-flight of the first aircraft and the target aircraft, and implement co-flight of at least two aircrafts.

To better understand and implement the foregoing solution of the embodiments of this application, detailed descriptions are provided below by using corresponding application scenarios as an example. Next, an example in which the foregoing aircraft is specifically an unmanned aerial vehicle is used for description. For example, the first aircraft is an unmanned aerial vehicle that implements flight with automatic pathfinding, and the target aircraft is an unmanned aerial vehicle operated by the user. This embodiment of this application can greatly improve user experience of the unmanned aerial vehicle, thereby enriching an application scenario of the unmanned aerial vehicle. AI pathfinding in a 1V1 case of unmanned aerial vehicles needs to be performed by two unmanned aerial vehicles together, where one unmanned aerial vehicle is operated by the user, and the other unmanned aerial vehicle implements flight with pathfinding according to the flight control method described in this embodiment of this application, without requiring a user operation.

FIG. 2-a is a schematic diagram of a flight control implementation solution for an aircraft according to an embodiment of this application. AI pathfinding in a 1V1 case of unmanned aerial vehicles includes the following several parts: a setting is made on a mobile phone of a user to enter an AI automatic flight mode; an APP in the mobile phone sends a flight control instruction to a flight control apparatus; the flight control apparatus enters the AI automatic flight mode; an unmanned aerial vehicle automatically flies according to an AI algorithm; the mobile phone of the user cancels the AI automatic flight mode; the mobile phone instructs the flight control apparatus to exit the AI automatic flight mode; and the unmanned aerial vehicle automatically hovers and then descends.

Figure 2A:
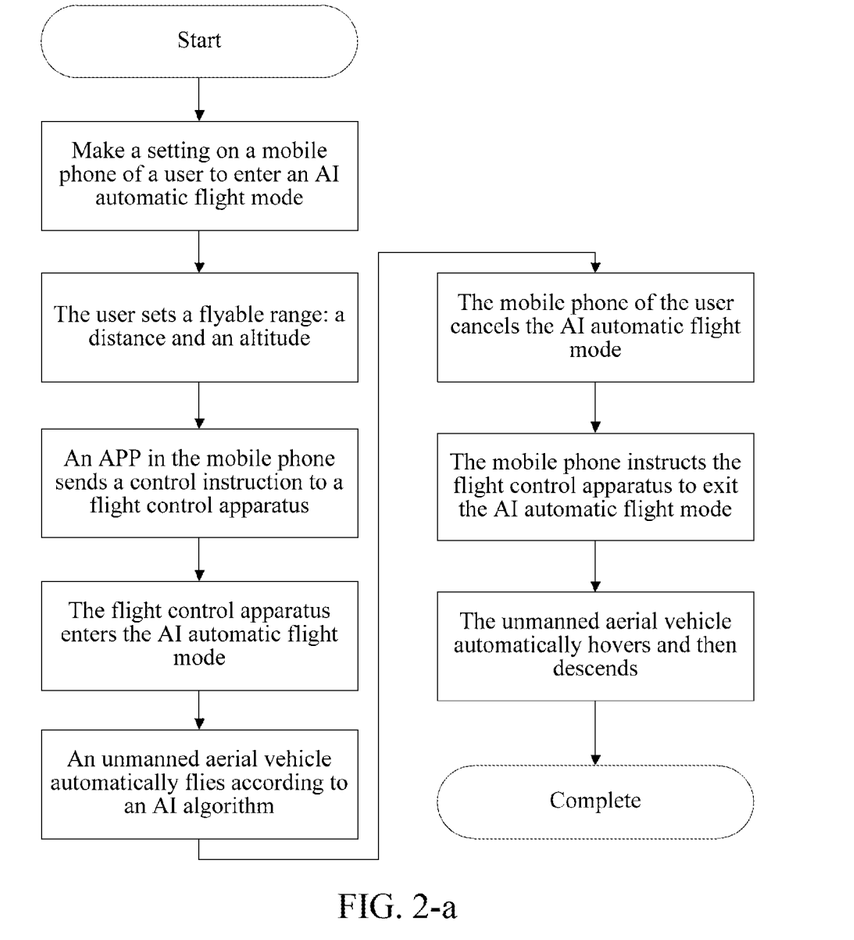

1. That a setting is made on the mobile phone of the user to enter the AI automatic flight mode means that the user uses the mobile phone to enable the AI automatic flight mode, and sets a flyable range of the unmanned aerial vehicle: parameters of maximum and minimum flight altitudes, and a maximum distance that the unmanned aerial vehicle can fly to, to complete initialization.

2. After the setting is completed, the APP in the mobile phone sends the control instruction and a related parameter to the flight control apparatus by using the MavLink protocol.

3. After receiving the control instruction and parameter data, the flight control apparatus of the unmanned aerial vehicle enters a flight mode with AI automatic pathfinding, an executes different AI algorithms according to data provided by a visual system of the unmanned aerial vehicle.

3.1 After entering the AI automatic flight mode, the unmanned aerial vehicle takes off several seconds later and flies to a predetermined altitude (the time and the altitude may be set), and hovers at a specified altitude.

Figure 2B:
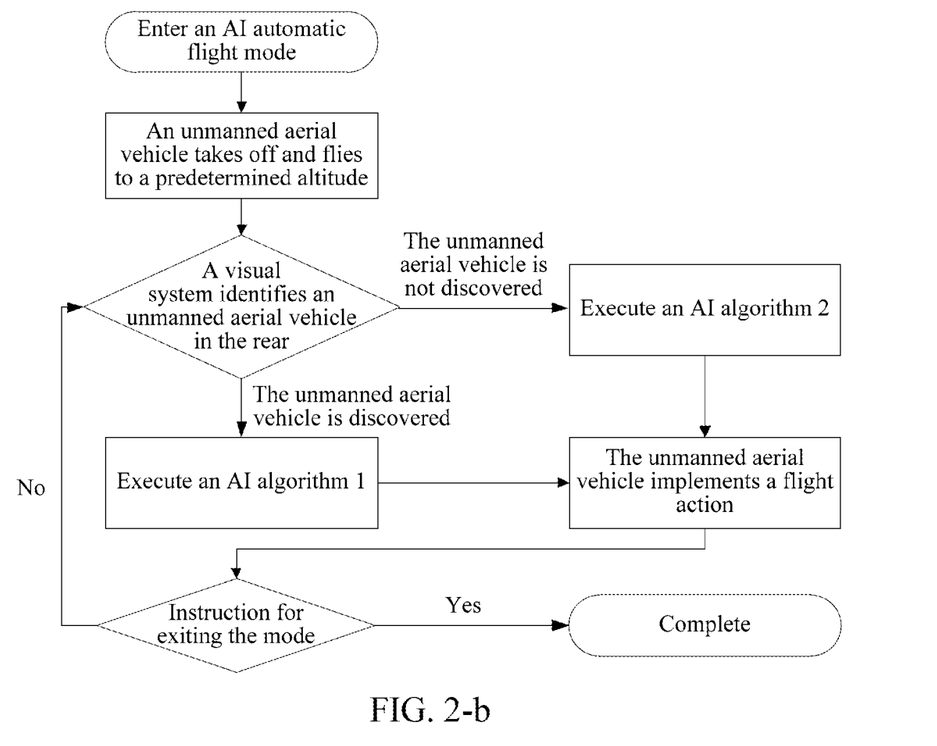
Figure 2C:
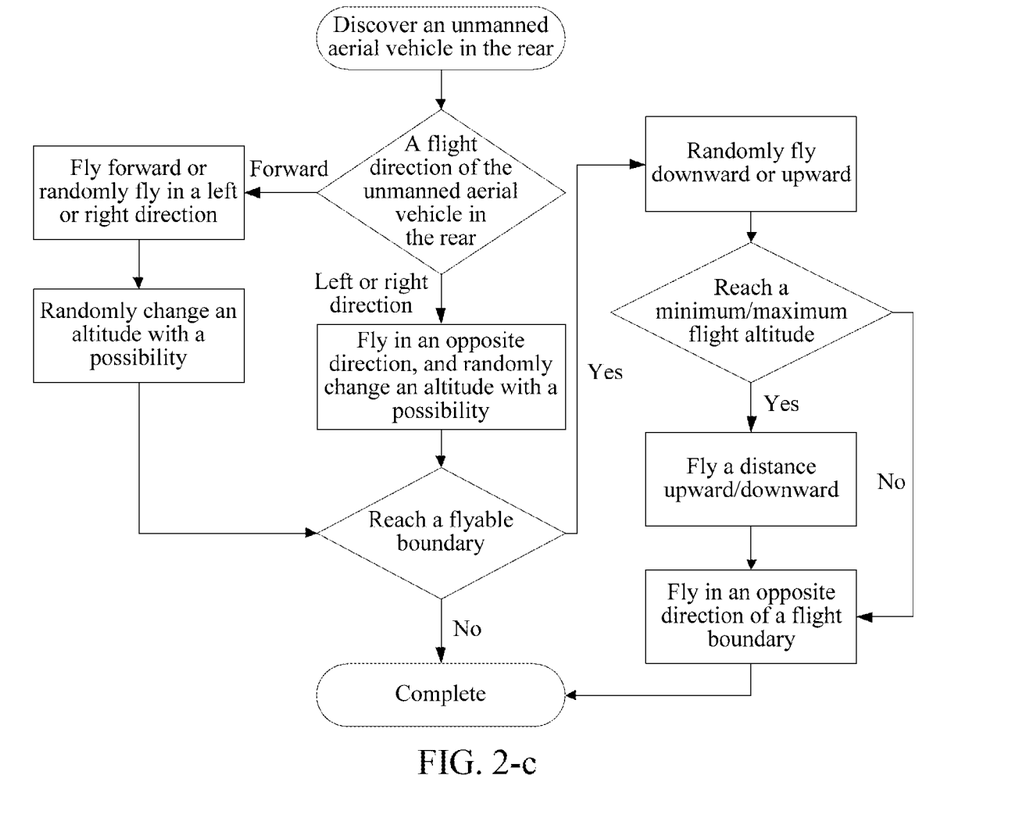
Figure 2D:
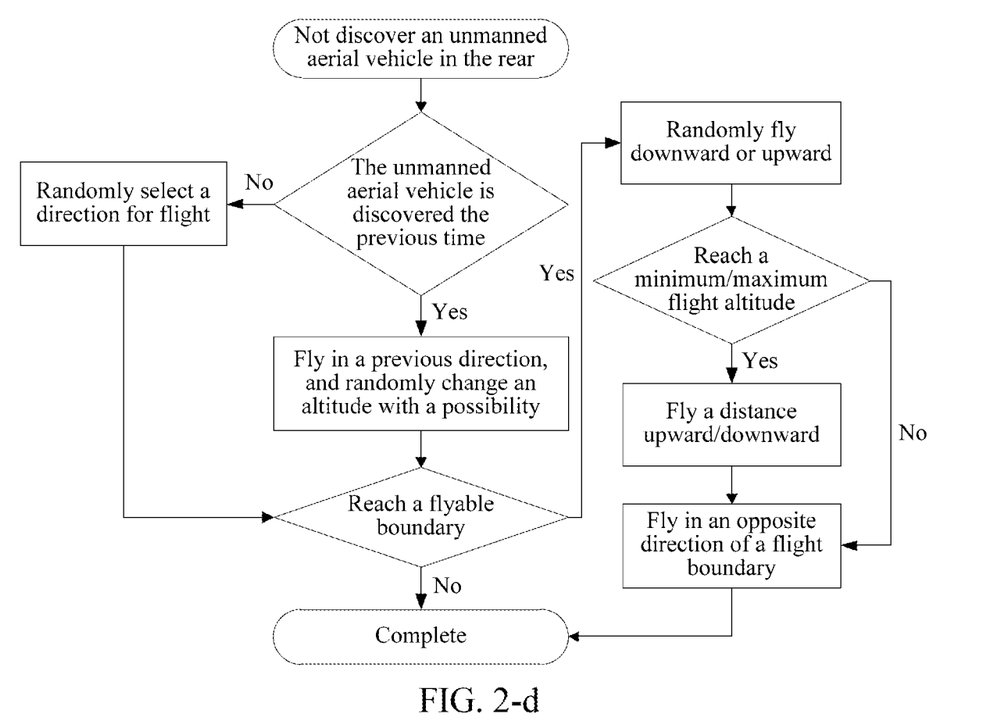

3.2 The flight control apparatus of the unmanned aerial vehicle determines, according to the visual system, whether an unmanned aerial vehicle target is discovered in the rear. FIG. 2-b is a schematic diagram of an automatic pathfinding implementation solution for an aircraft according to an embodiment of this application. If the unmanned aerial vehicle is discovered, an AI algorithm 1 is executed; or if the unmanned aerial vehicle is not discovered, an AI algorithm 2 is executed; and a flight action is calculated by using the algorithm. The AI algorithm 1 is shown in FIG. 2-c, and the AI algorithm 2 is shown in FIG. 2-d.

3.2.1 The AI algorithm 1 is: first determining a flight direction of the unmanned aerial vehicle in the rear; and if the unmanned aerial vehicle in the rear flies to the left/the right, selecting flight in a right/left direction (flight in an opposite direction), and randomly changing an altitude for flight; or if the unmanned aerial vehicle in the rear flies forward, selecting forward flight or random left or right flight (backward flight is not selected because there is a possibility of colliding with the unmanned aerial vehicle in the rear), and randomly changing an altitude with a possibility.

Then, safety boundary check is performed. If a flyable boundary is not reached, the algorithm is completed. If the flyable boundary is reached, the unmanned aerial vehicle randomly flies downward or upward, and flies a distance in an opposite direction of the flight boundary (that is, returns from a position at the boundary). If the unmanned aerial vehicle reaches the minimum/maximum flight altitude when flying downward or upward, the unmanned aerial vehicle flies a distance upward/downward first, and then flies a distance in an opposite direction of the flight boundary.

3.2.2 The AI algorithm 2 is: first determining whether the unmanned aerial vehicle is discovered by the visual system the previous time; and if the unmanned aerial vehicle is not discovered during previous calculation, randomly selecting one of a forward direction, a left direction, and a right direction for flight (a backward direction is not selected because there is a possibility of colliding with the unmanned aerial vehicle in the rear); or if the unmanned aerial vehicle in the rear is discovered during previous calculation, and the unmanned aerial vehicle in the rear is not discovered during current calculation, implementing flight in a previous direction, and randomly changing an altitude.

Then, safety boundary check is performed. If a flyable boundary is not reached, the algorithm is completed. If the flyable boundary is reached, the unmanned aerial vehicle randomly flies downward or upward, and flies a distance in an opposite direction of the flight boundary (that is, returns from a position at the boundary). If the unmanned aerial vehicle reaches the minimum/maximum flight altitude when flying downward or upward, the unmanned aerial vehicle flies a distance upward/downward first, and then flies a distance in an opposite direction of the flight boundary.

3.3 At a random time value (for example, 3 to 5 seconds) within a particular range, the flight control apparatus implements the flight action.

3.4 After the action is completed, if an instruction for exiting the AI automatic flight mode is received, the AI automatic flight mode is exited; otherwise, the algorithm continues to be executed to calculate a next flight action.

4. A setting is made on the mobile phone of the user to exit the AI automatic flight mode; the APP in the mobile phone sends the control instruction to the flight control apparatus of the unmanned aerial vehicle by using the MavLink protocol; and after receiving the control instruction, the flight control apparatus exit the AI automatic flight mode.

5. The unmanned aerial vehicle enters a hover state according to a presetting, and after waiting for a period of time, descends or returns to a takeoff point if there is no user control signal.

During the flight, the unmanned aerial vehicle keeps responding to a user input in priority, and the user may interrupt automatic flight of the unmanned aerial vehicle, and voluntarily controls flight of the unmanned aerial vehicle. In this way, safety of the unmanned aerial vehicle can be ensured in priority, and occurrence of an abnormal case such as a collision of the unmanned aerial vehicle can be prevented.

In this embodiment of this application, by means of an AI pathfinding algorithm for an unmanned aerial vehicle, a flight action may be automatically calculated, and the unmanned aerial vehicle is controlled to automatically fly, so that a problem that flight of an unmanned aerial vehicle needs to be operated by a user is resolved, and a solution is creatively provided, in which two unmanned aerial vehicles fly together, where one is controlled by the user, and the other is controlled by using the AI pathfinding algorithm, thereby greatly improving experience of the unmanned aerial vehicle from the perspective of playability, and enriching an application scenario of the unmanned aerial vehicle. By means of the AI pathfinding algorithm for the unmanned aerial vehicle, the flight control apparatus voluntarily calculates a next required flight action according to a related parameter and visual data, and implements the flight action.

It should be noted that, for brief description, the foregoing method embodiments are represented as a series of action combinations. However, persons skilled in the art should appreciate that this application is not limited to the described order of the actions, because according to this application, some steps may be performed in other orders or performed at the same time. In addition, persons skilled in the art should also know that all the embodiments described in the specification are preferred embodiments, and the related actions and modules are not necessarily mandatory to this application.

To better implement the foregoing solutions of the embodiments of this application, the following further provides related apparatuses corresponding to the foregoing solutions.

Referring to FIG. 3-a, a flight control apparatus 300 provided in an embodiment of this application may include an obtaining module 301, a flight mode control module 302, and a target tracking module 303.

Figure 3A:
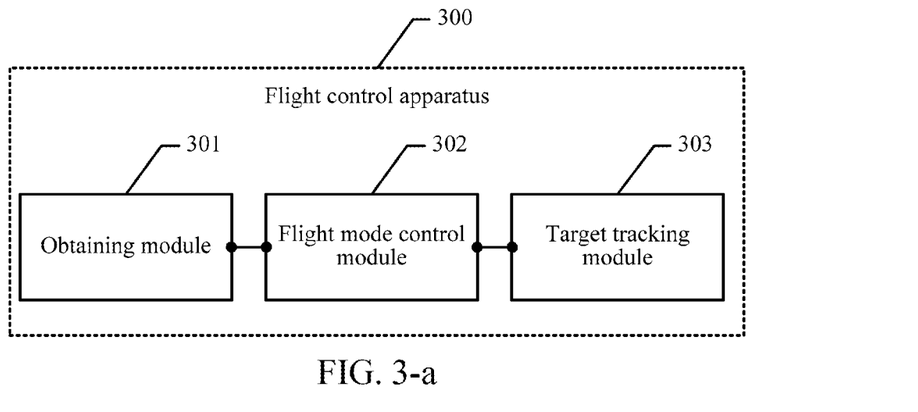

The obtaining module 301 is configured to obtain a first flight control instruction and a flight parameter that are sent by a mobile terminal, the first flight control instruction being used to control the first aircraft to enter an AI automatic flight mode, and the flight parameter including a preset flight altitude.

The flight mode control module 302 is configured to: in response to the first flight control instruction, control the first aircraft to fly to the preset flight altitude.

The target tracking module 303 is configured to: determine whether a target aircraft exists within the surrounding of the first aircraft; and determine a flight attitude of the first aircraft according to a determining result obtained after whether the target aircraft exists within the surrounding of the first aircraft is determined.

In some embodiments of this application, the flight mode control module 302 controls, according to the first flight control instruction, the first aircraft to enable an AI automatic flight mode; and control, according to the flight parameter, the first aircraft to fly to the preset flight altitude and then enter a hover state.

Figure 3B:
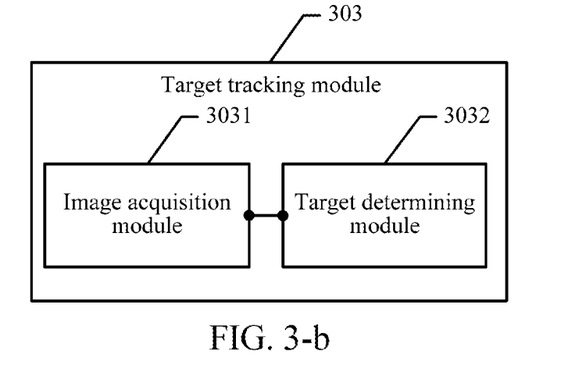

In some embodiments of this application, referring to FIG. 3-b, the target tracking module 303 includes:

an image acquisition module 3031, configured to acquire an ambient environment image of the first aircraft; and a target determining module 3032, configured to determine, according to the ambient environment image, whether the target aircraft exists within the surrounding of the first aircraft.

In some embodiments of this application, the image acquisition module 3031 is specifically configured to: acquire a front environment image of the first aircraft according to a direction of a current angle of view of a camera of the first aircraft, and then adjust the direction of the angle of view of the camera of the first aircraft, to acquire a rear environment image, a left environment image, and a right environment image of the first aircraft.

In some embodiments of this application, when the first aircraft is in the hover state, the image acquisition module 3031 acquires the ambient environment image of the first aircraft.

Figure 3C:
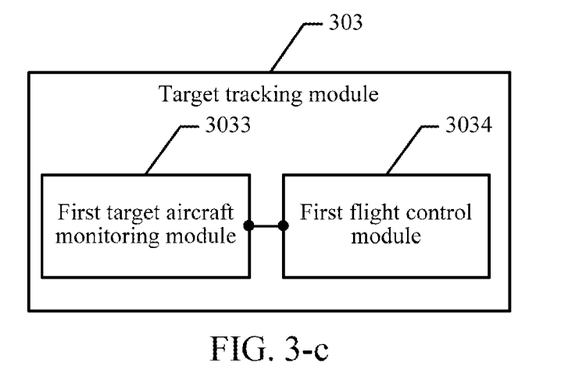

In some embodiments of this application, referring to FIG. 3-c, the target tracking module 303 includes:

a first target aircraft monitoring module 3033, configured to obtain a flight direction of the target aircraft if it is determined according to the determining result that the target aircraft is discovered in a rear environment of the first aircraft; and a first flight control module 3034, configured to: control, if the target aircraft flies to the first aircraft in a left direction of the first aircraft, the first aircraft to fly in a right direction, and change a flight altitude of the first aircraft; control, if the target aircraft flies to the first aircraft in a right direction of the first aircraft, the first aircraft to fly in a left direction, and change a flight altitude of the first aircraft; or control, if the target aircraft flies to the first aircraft in a forward direction of the first aircraft, the first aircraft to fly in the forward direction, or fly in a right direction, or fly in a left direction, and change a flight altitude of the first aircraft.

Figure 3D:
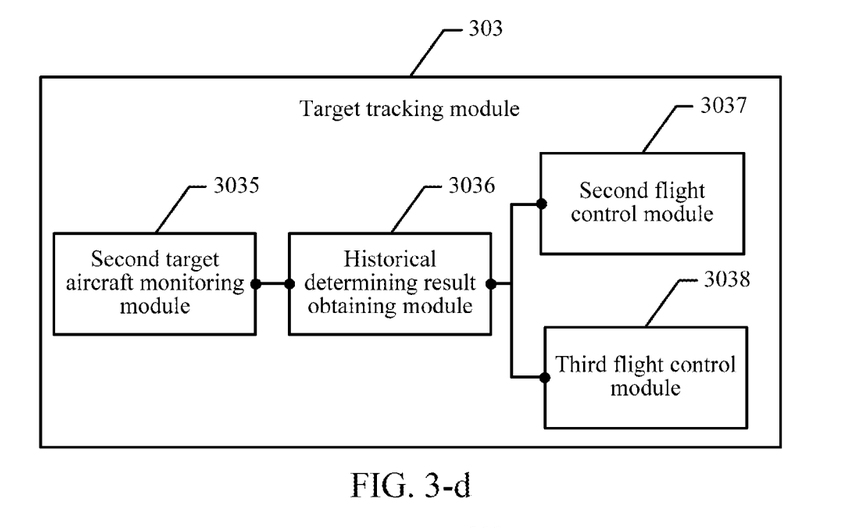

In some embodiments of this application, referring to FIG. 3-d, the target tracking module 303 includes:

a second target aircraft monitoring module 3035, configured to determine, according to a current determining result, whether the target aircraft is discovered within the surrounding of the first aircraft;

a historical determining result obtaining module 3036, configured to: if the second target aircraft monitoring module 3035 determines, according to the current determining result, that the target aircraft is not discovered within the surrounding of the first aircraft, obtain whether the target aircraft is discovered within the surrounding of the first aircraft in a previous determining result before the current determining result;

a second flight control module 3037, configured to adjust the flight attitude of the first aircraft according to a flight attitude adjustment manner for the first aircraft for the previous determining result if it is determined, according to the previous determining result, that the target aircraft is discovered within the surrounding of the first aircraft; and a third flight control module 3038, configured to control the flight direction of the first aircraft when it is determined, according to the previous determining result, that the target aircraft is not discovered within the surrounding of the first aircraft. For example, if the target aircraft is not discovered in a rear environment of the first aircraft, the first aircraft is controlled to fly in a forward direction, or fly in a right direction, or fly in a left direction.

Figure 3E:
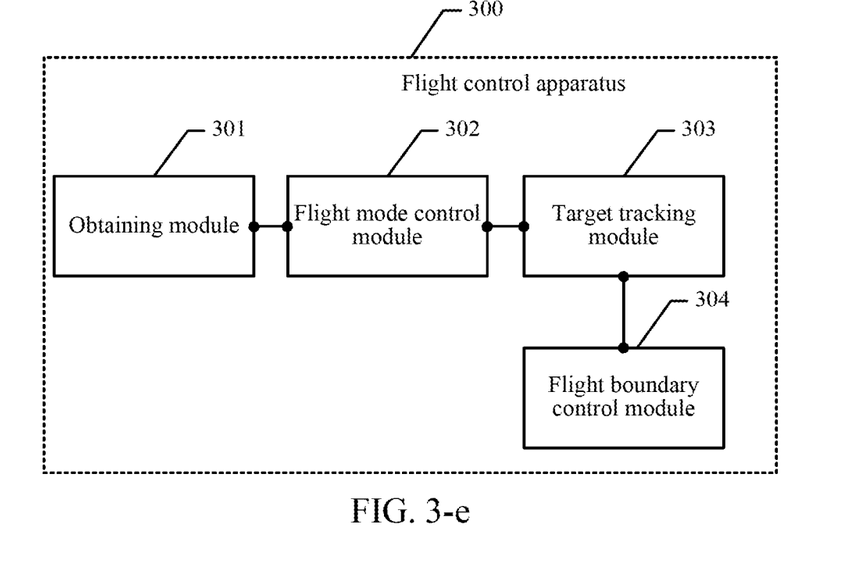

In some embodiments of this application, the flight parameter further includes a preset flight boundary, and the flight boundary includes at least one of the following information: a maximum flight distance, a maximum flight altitude, and a minimum flight altitude. Referring to FIG. 3-e, the flight control apparatus 300 further includes: a flight boundary control module 304, configured to: after the target tracking module 303 determines the flight attitude of the first aircraft according to the determining result obtained after whether the target aircraft exists within the surrounding of the first aircraft is determined, determine whether the first aircraft reaches the flight boundary; and change the flight attitude of the first aircraft if the first aircraft reaches the flight boundary.

In some embodiments of this application, the flight boundary control module 304 is specifically configured to: control the first aircraft to fly in an upward direction and fly in a backward direction, or fly in a downward direction and fly in a backward direction, or fly in an upward direction and fly in a right direction, or fly in a downward direction and fly in a right direction, or fly in an upward direction and fly in a left direction, or fly in a downward direction and fly in a left direction; determine whether the first aircraft flies to the maximum flight altitude in the upward direction, and if yes, control the first aircraft to fly downward; and determine whether the first aircraft flies to the minimum flight altitude in the downward direction, and if yes, control the first aircraft to fly upward.

In some embodiments of this application, the obtaining module 301 is further configured to obtain a second flight control instruction sent by the mobile terminal, where the second flight control instruction is used to control the first aircraft to cancel the AI automatic flight mode.

The flight mode control module 302 is further configured to: control the first aircraft to exit the AI automatic flight mode, and control the first aircraft to enter the hover state according to the second flight control instruction.

Figure 3F:
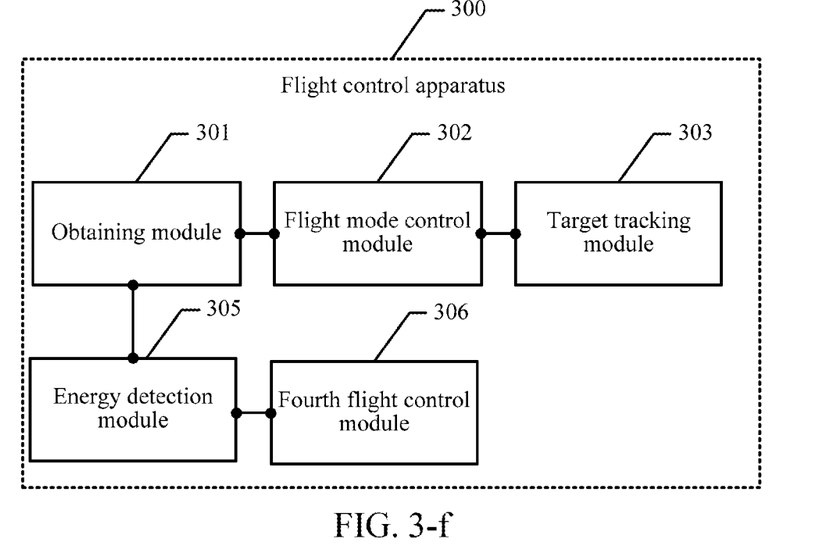

In some embodiments of this application, referring to FIG. 3-f, the flight control apparatus 300 further includes:

an energy detection module 305, configured to: obtain a battery level of the first aircraft, and determine whether the battery level of the first aircraft is less than a preset threshold; and a fourth flight control module 306, configured to: control the first aircraft to descend if the battery level is less than threshold; or control the first aircraft to return to a takeoff point if the battery level is greater than or equal to the threshold.

It may be learned from the foregoing descriptions of this embodiment of this application, a first aircraft may enable an AI automatic flight mode according to a first flight control instruction and a flight parameter that are sent by a mobile terminal, and fly to a preset flight altitude and then enter a hover state. Therefore, the first aircraft can automatically take off without requiring a real-time operation by a user. In this embodiment of this application, whether a target aircraft exists within the surrounding of the first aircraft may be further determined, and a flight attitude of the first aircraft is determined or adjusted according to a determining result obtained after whether the target aircraft exists within the surrounding of the first aircraft is determined. Therefore, a flight process of the first aircraft is closely related to the target aircraft, so as to implement co-flight of the first aircraft and the target aircraft, and implement co-flight of at least two aircrafts.

Figure 4:
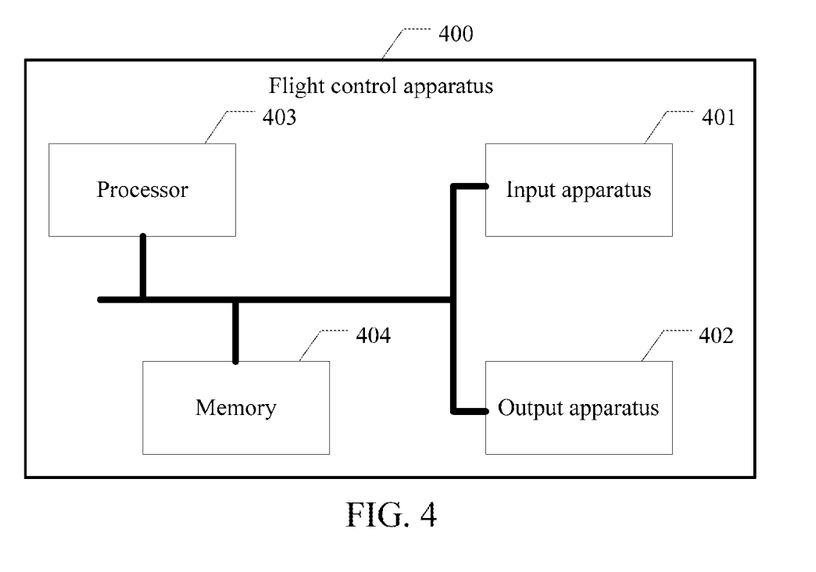

Referring to FIG. 4, an embodiment of this application provides a flight control apparatus 400, which can implement a function of the flight control apparatus in the embodiment shown in FIG. 3-a to FIG. 3-e. The flight control apparatus 400 includes:

an input apparatus 401, an output apparatus 402, at least one processor 403, and at least one memory 404 that are connected to each other. The memory 404 may be a transient or persistent storage. A program stored in the memory 404 may include one or more modules, and each module may include a series of instructions and operations for the flight control apparatus. Further, the central processing unit (CPU) 403 may be configured to communicate with the memory 404, and execute, on the flight control apparatus 400, a series of instructions and operations in the memory 404.

The flight control apparatus 400 may further include one or more power supplies, one or more wired or wireless network interfaces, one or more input/output interfaces, and/or one or more operating systems. The steps of the method performed by the flight control apparatus in the foregoing embodiment may be based on the structure of the flight control apparatus shown in FIG. 4.

In addition, it should be noted that the described apparatus embodiment is merely exemplary. The units described as separate parts may or may not be physically separate, and parts displayed as units may or may not be physical units, and may be located at one position, or may be distributed on a plurality of network units. Some or all the modules may be selected according to actual needs to achieve the objectives of the solutions of the embodiments. In addition, in the accompanying drawings of the apparatus embodiments provided in this application, a connection relationship between modules indicates that communication and a connection exists between the modules, which may be implemented as one or more communications buses or signal lines. Persons of ordinary skill in the art may understand and implement the embodiments of this application.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

Based on the foregoing descriptions of the embodiments, persons skilled in the art may clearly understand that this application may be implemented by software in addition to necessary universal hardware and certainly may also be implemented by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be in various forms, for example, in a form of an analog circuit, a digital circuit, a dedicated circuit, or the like. However, for this application, in most cases, implementation by using a software program is a preferred implementation. Based on such an understanding, the technical solutions of this application essentially, or the part contributing to the existing technology may be implemented in a form of a software product. The computer software product is stored in a readable storage medium, for example, a floppy disk, a USB flash drive, a read-only memory (ROM), a random access memory (RAM), a magnetic disk, or an optical disc of the computer, and includes several instructions for instructing a computer device (which may be a personal computer, a server, or a network device) to perform the methods according to the embodiments of this application.

In conclusion, the foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some of the technical features thereof, as long as these modifications or replacements do not cause the essence of corresponding technical solutions to depart from the spirit and scope of the technical solutions of the embodiments of this application.

What is claimed is:

1. A method for flight control, comprising:
   obtaining, by flight control circuitry in a first aircraft, a first flight control instruction and a flight parameter that are sent by a mobile terminal device, the flight parameter being indicative of a preset flight altitude;
   in response to the first flight control instruction, controlling, by the flight control circuitry, the first aircraft to fly to the preset flight altitude;
   detecting, by the flight control circuitry, existence of a second aircraft within a surrounding of the first aircraft; and
   in response to the existence of the second aircraft within the surrounding of the first aircraft being detected, obtaining a flight direction of the second aircraft, and adjusting, by the flight control circuitry, a flight posture of the first aircraft according to the flight direction of the second aircraft to cause the first aircraft to fly along with the second aircraft.

2. The method according to claim 1, further comprising:
   acquiring an ambient environment image of the first aircraft; and
   determining, according to the ambient environment image, whether the second aircraft exists within the surrounding of the first aircraft.

3. The method according to claim 2, further comprising:
   varying a viewing angle of a camera on the first aircraft; and
   acquiring a plurality of ambient environment images respectively at different viewing angles.

4. The method according to claim 2, further comprising:
   controlling the first aircraft to enter a hover state when the first aircraft flies to the preset flight altitude; and
   acquiring the ambient environment image when the first aircraft is in the hover state.

5. The method according to claim 1, further comprising:
   adjusting a flight direction of the first aircraft to be the same as the flight direction of the second aircraft.

6. The method according to claim 1, further comprising at least one of:
   when the second aircraft flies towards the first aircraft from a left side of the first aircraft, controlling the first aircraft to fly to a right side of the second aircraft, and changing a flight altitude of the first aircraft;
   when the second aircraft flies towards the first aircraft from a right side of the first aircraft, controlling the first aircraft to fly to a left side of the second aircraft, and changing the flight altitude of the first aircraft; or
   when the second aircraft flies towards the first aircraft from a back side of the first aircraft, controlling the first aircraft to fly in one of a forward direction, a right direction, or a left direction, and changing the flight altitude of the first aircraft.

7. The method according to claim 1, further comprising:
   obtaining, when the second aircraft is not discovered within the surrounding of the first aircraft, a previous existence detection of the second aircraft in the surrounding of the first aircraft; and
   adjusting the flight posture of the first aircraft according to a previous flight posture adjustment that is determined according to the previous existence detection of the second aircraft.

8. The method according to claim 1, further comprising:
   determining whether the first aircraft approaches a flight boundary; and
   changing the flight posture of the first aircraft in a direction to remain in the flight boundary when the first aircraft approaches the flight boundary.

9. The method according to claim 1, wherein the flight posture comprises at least one of a flight speed, a flight altitude, and a flight direction.

10. A control apparatus in an aircraft, comprising:
    interface circuitry configured to receive a first flight control instruction and a flight parameter that are sent by a mobile terminal device, the flight parameter being indicative of a preset flight altitude; and
    processing circuitry configured to:
      in response to the first flight control instruction, control the aircraft to fly to the preset flight altitude;
      detect existence of another aircraft within a surrounding of the aircraft; and
      in response to the existence of the other aircraft within the surrounding of the aircraft being detected,
        obtain a flight direction of the other aircraft, and
        adjust a flight posture of the aircraft according to the flight direction of the other aircraft to cause the aircraft to fly along with the other aircraft.

11. The control apparatus according to claim 10, wherein the processing circuitry is configured to:
    acquire an ambient environment image of the aircraft; and
    determine, according to the ambient environment image, whether the other aircraft exists within the surrounding of the aircraft.

12. The control apparatus according to claim 11, wherein the processing circuitry is configured to:
    vary a viewing angle of a camera on the aircraft; and
    acquire a plurality of ambient environment images respectively at different viewing angles.

13. The control apparatus according to claim 11, wherein the processing circuitry is configured to:
    control the aircraft to enter a hover state when the aircraft flies to the preset flight altitude; and
    acquire the ambient environment image when the aircraft is in the hover state.

14. The control apparatus according to claim 10, wherein the processing circuitry is configured to:
    adjust a flight direction of the aircraft to be the same as the flight direction of the other aircraft.

15. The control apparatus according to claim 10, wherein the processing circuitry is configured to:

when the other aircraft flies towards the aircraft from a left side of the aircraft, control the aircraft to fly to a right side of the other aircraft, and change a flight altitude of the aircraft;

when the other aircraft flies towards the aircraft from a right side of the aircraft, control the aircraft to fly to a left side of the other aircraft, and change the flight altitude of the aircraft; or when the other aircraft flies towards the aircraft from a back side of the aircraft, control the aircraft to fly in one of a forward direction, a right direction, or a left direction, and change the flight altitude of the aircraft.

16. The control apparatus according to claim 10, wherein the processing circuitry is configured to:
obtain, when no aircraft is discovered within the surrounding of the aircraft, a previous existence detection of the other aircraft in the surrounding of the aircraft; and
adjust the flight posture of the aircraft according to a previous flight posture adjustment that is determined according to the previous existence detection.

17. The control apparatus according to claim 10, wherein the processing circuitry is configured to:
determine whether the aircraft approaches a flight boundary for the aircraft; and
change the flight posture of the aircraft in a direction to remain in the flight boundary when the aircraft approaches the flight boundary.

18. A non-transitory computer-readable medium storing instructions which when executed by a computer in an aircraft cause the computer to perform a process comprising:
obtaining a first flight control instruction and a flight parameter that are sent by a mobile tell final device, the flight parameter being indicative of a preset flight altitude;
in response to the first flight control instruction, controlling the aircraft to fly to the preset flight altitude;
detecting existence of another aircraft within a surrounding of the aircraft; and
in response to the existence of the other aircraft within the surrounding of the aircraft being detected,
obtaining a flight direction of the other aircraft, and
adjusting a flight posture of the aircraft according to the flight direction of the other aircraft to cause the aircraft to fly along with the other aircraft.

19. The non-transitory computer-readable medium according to claim 18, wherein the process further comprising:
adjusting a flight direction of the aircraft to be the same as the flight direction of the other aircraft.

20. The non-transitory computer-readable medium according to claim 18, wherein the process further comprising at least one of:
when the other aircraft flies towards the aircraft from a left side of the aircraft, controlling the aircraft to fly to a right side of the other aircraft, and changing a flight altitude of the aircraft;
when the other aircraft flies towards the aircraft from a right side of the aircraft, controlling the aircraft to fly to a left side of the other aircraft, and changing the flight altitude of the aircraft; or
when the other aircraft flies towards the aircraft from a back side of the aircraft, controlling the aircraft to fly in one of a forward direction, a right direction, or a left direction, and changing the flight altitude of the aircraft.

* * * * *